UNITED STATES PATENT OFFICE.

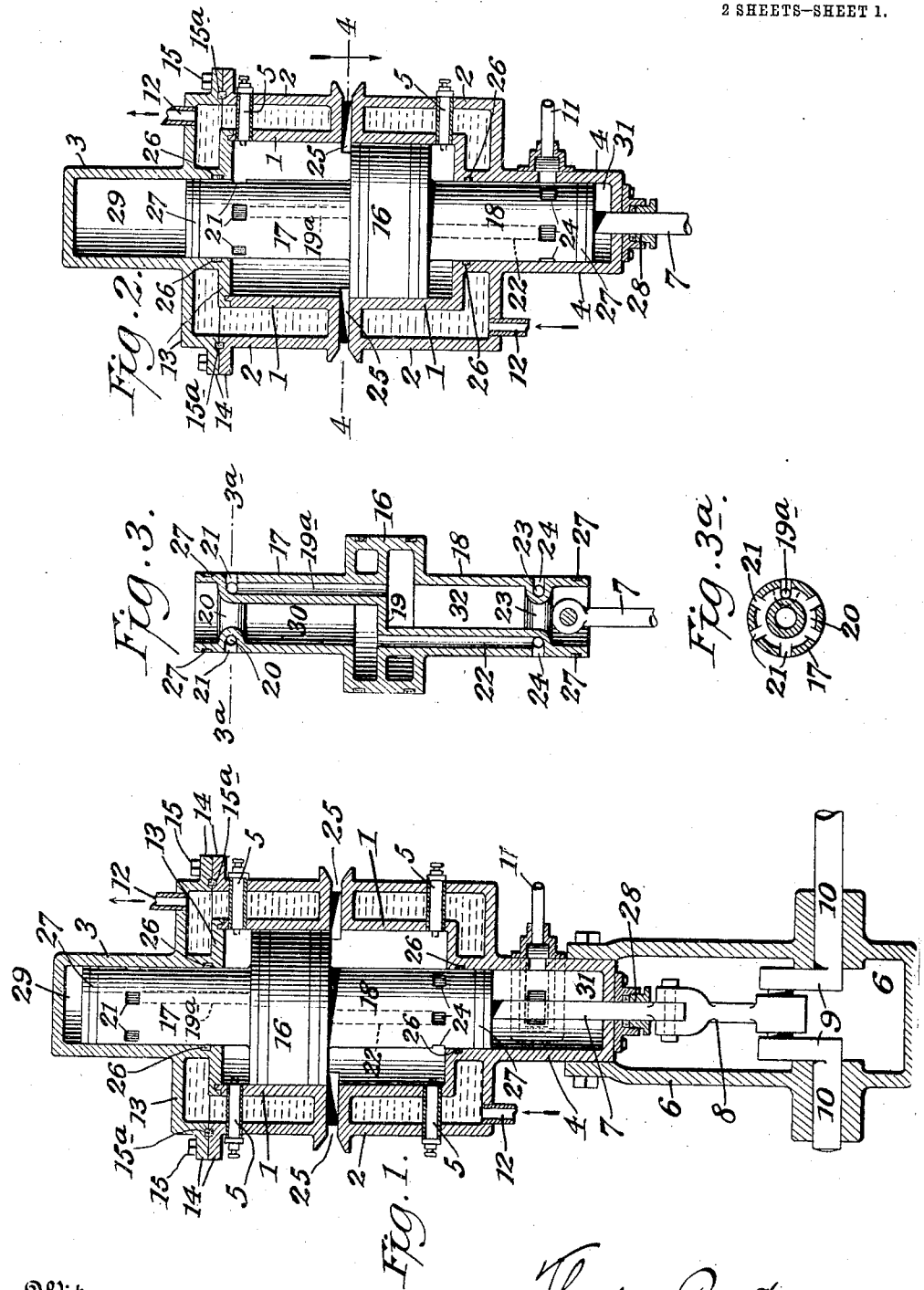

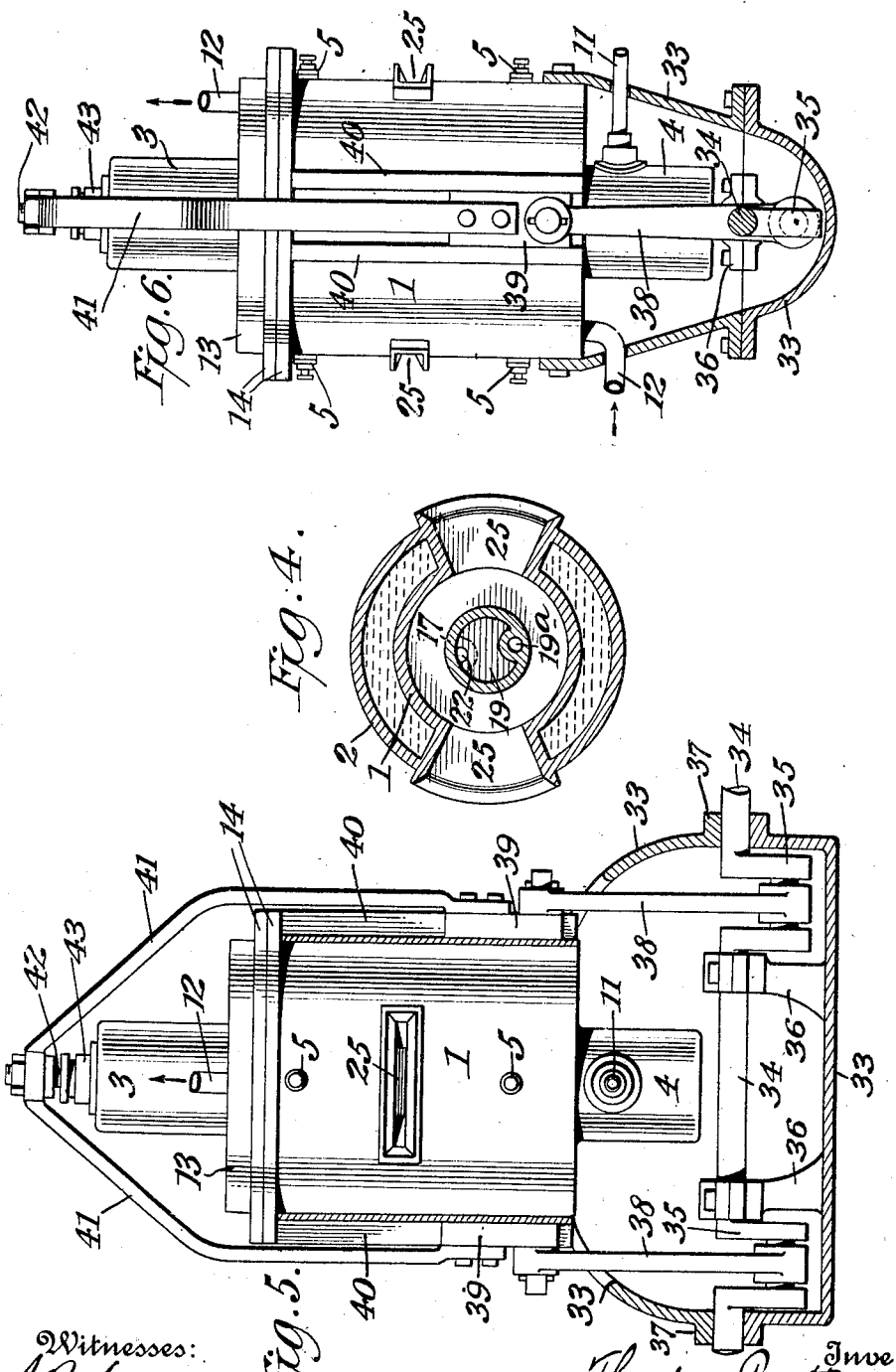

THEODORE PRATT, OF NEW YORK, N. Y.

INTERNAL-COMBUSTION ENGINE.

1,099,860.      Specification of Letters Patent.      Patented June 9, 1914.

Application filed August 1, 1913. Serial No. 782,411.

*To all whom it may concern:*

Be it known that I, THEODORE PRATT, a citizen of the United States, and a resident of the borough of Brooklyn, county of Kings, city and State of New York, have invented a new and useful Improvement in Internal-Combustion Engines, of which the following is a specification, reference being had to the accompanying drawings.

Under this invention the piston is positively driven at the end of each stroke and to accomplish this result, the cylinder is provided with extension chambers at its opposite ends and the piston is provided with corresponding extensions which in the transit of the piston through the cylinder move plunger-like through the extensions of the cylinder. The piston and also its extensions are hollow and are provided with certain gas passages arranged in such manner that at each reciprocation of the piston, the fuel is compressed within these spaces so that when communication between them and the cylinder is intermittently established, reliable supply of gas to the cylinder is assured and also at each reciprocation of the piston one of the extension chambers of the cylinder and part of the hollow spaces in the piston become vacuum chambers, compelling by suction the positive intaking of successive charges of gas to be thereafter transferred to the explosion chambers of the cylinder. In this way the chambers in the cylinder extensions and the hollow spaces within the piston act alternately as vacuum or suction chambers and compression or ejection chambers. The exhaust is located at or near the longitudinal center of the cylinder and the intake ports from the piston open into the explosion chambers of the cylinder at its ends, so that at each reciprocation of the piston the exhaust occurs at points as far as possible from the intake and since the incoming charges are under pressure, the exhaust is made positive and the scavenging of the spent products assured. The cylinder is provided with a water jacket, sparking devices and the other usual appliances and accessories of such apparatus.

The invention secures a series of important advantages, some of them, as I believe, never realized before, and others, already known, realized in a more advantageous manner. They will be referred to below.

Referring to the drawings, Figure 1 is a vertical sectional view of the engine, crank case, and driving shaft, the piston being in its elevated position; Fig. 2 is a vertical sectional view similar to Fig. 1, the crank case, shaft, etc., being omitted and the piston shown in its lowermost position; Fig. 3 is a vertical sectional view of the piston, showing its internal construction; Fig. 3ª is a horizontal sectional view taken on the line 3ª of Fig. 3; Fig. 4 is a horizontal sectional view taken through the cylinder on the line 4—4 of Fig. 2, looking in the direction of the arrow; Fig. 5 is an elevation of a form of construction in which the height of the engine may be reduced should that be desirable; Fig. 6 is an elevation taken at right angles to Fig. 5 and showing the same construction as therein illustrated.

In the drawings 1 represents the cylinder proper. 2 its water jacket; 3 the extension from the cylinder at its upper part, 4 the extension from the cylinder at its lower part.

5, 5 are spark plugs, preferably four in number, although two only, as shown in Fig. 2, or any other desired number, may be used.

6 is the crank case, 7 the piston rod, 8 the connecting rod, 9 the crank, 10 the driving shaft, 11 the gas supply pipe, 12, 12, water inlet and outlet pipes for the water jacket.

I prefer to make the upper part or end of the cylinder in the form of a removable plate 13 fastened to the main cylinder casting by flanges 14 and bolts 15 in a manner well known and the upper cylinder extension may beneficially be cast integral with this plate. I prefer also to provide the joint between these parts with a suitable packing 15ª.

16 is the piston. It is provided with extensions 17, 18. The piston and its extensions are hollow and the piston is divided in its middle section by a diaphragm 19. Both of the extensions are open ended, as shown best in Fig. 3. Within the piston are two gas ducts, one of which 19ª, extends from the chamber below the diaphragm upwardly terminating in a circumferentially arranged gas duct 20 from which openings or ports 21 (see Fig. 1) extend through the wall of the upper extension. A similar gas duct 22 connects with the chamber above the diaphragm; and is likewise provided at its lower end with a circumferentially extending gas duct 23 provided with lateral openings or ports 24 through the walls of the lower extension. The exhaust ports are shown at 25, 25. As stated above, they are about midway the length of the cylinder and as shown best in Fig. 4 have large capacity, being quite extended circumferentially of the cylinder and flared at their outer ends. It will of course be understood that suitable piping is connected with the outer orifices of these exhaust ports to conduct the products of combustion away. The cylinder is provided with suitable packing 26 at both ends and the piston is likewise provided with suitable packings 27 at both ends. 28 is the usual stuffing box for the piston rod.

The operation is as follows: Let it be assumed that in Fig. 2 the piston has compressed the charge in the lower half of the explosion chamber of the cylinder and that its firing is about to take place. When the piston is in its lowermost position, as shown in Fig. 2, the gas ports 24 in the extension 18 register with the fuel supply pipe 11 which of course is connected with the carbureter or other suitable source of fuel supply. The gas entering the ports 24, or such one or more of them as are then in registration with the gas supply pipe 11, passes by suction (see below) into the circumferential duct 23, thence upwardly through the pipe 22 to the chamber 30 within the piston above the diaphragm 19 and fills the empty space 29 above the piston extension 17 in the upper cylinder extension. The piston in its passage to its lowermost position as shown in Fig. 2, has compressed the charge then present in the explosion chamber of the cylinder beneath it, and at or about this time the charge is fired by the lower spark plugs 5. The piston under the force of the explosion is thrown upwardly carrying the intake ports 24 away from the supply pipe 11 and at the same time covering the exhaust ports 25 which had previously been uncovered and as the piston rises the gas in the chamber 29 and in the hollow interior 30 of the piston is compressed because as the piston rises carrying the lower extension 18 upward, the gas ports 24 in it are covered by the walls of the lower cylinder extension and therefore the gas cannot escape but is imprisoned in the spaces referred to. As the piston reaches its uppermost position, shown in Fig. 1, the charge of fuel in the upper explosion chamber of the cylinder has in turn become compressed and at the same time the rising of the piston has generated a partial vacuum in the cylinder extension chamber 31 and in the hollow space 32 and in the pipe 19$^a$ and the circumferential duct 20 of the piston, so that as soon as the lower piston extension in its upward passage uncovers the mouth of the supply pipe 11, a fresh charge of gas is sucked into these spaces from the supply pipe 11. When the piston has reached approximately its uppermost position it will have passed over the exhaust ports 25, 25, so that the lower explosion chamber of the cylinder is now exhausting. While the piston is in its uppermost position and just before the firing of the compressed charge in the upper explosion chamber of the cylinder, the ports 24 of the lower piston extension 18 as seen in Fig. 1, register with the lower end of the lower explosion chamber so that the compressed gases in the chamber 29 of the cylinder extension and in the hollow interior chamber 30 of the piston forcibly inject themselves into the lower explosion chamber of the cylinder, thus positively effecting the ejection through the exhaust ports of any remnant of the products of the previous combustion and compelling a complete and efficient supply of fuel for the next succeeding explosion and the incoming charge being under pressure and the shape of the exhaust orifices such as described, the scavenging of them is very efficiently performed. The piston in its position shown in Fig. 1 having reached its uppermost position and compressed the charge in the explosion chamber above it, the charge is now fired, and the piston is in turn driven downwardly again covering the exhaust ports and in its descent the gas in the chamber 31 in the lower cylinder extension and in the chamber 32 within the hollow piston is in turn compressed so that when the piston has passed below the center and thus uncovered the exhaust ports 25, the ports 21 in the upper piston extension will come in registration with the upper edge of the upper explosion chamber in the cylinder and the gas being under compression forcibly injects itself into the cylinder above the now depressed piston and compels the complete expulsion of the products of combustion from the upper part of the cylinder through the exhaust passages and in turn positively insures a fresh charge for the next succeeding explosion, and also in the manner already described the descent of the piston in turn generates a partial vacuum in the cylinder extension chamber 29 and in the hollow space 30 of the piston and in the pipe 22 and circumferential duct 23 so that when in the descent of the piston the ports 24 in the lower piston extension register with the supply pipe 11, the suction instantly causes all the stated spaces to be filled with fresh gas which in turn will be ejected into the lower explosion chamber of the cylinder below the piston when the next upward movement of it shall bring the ports 24 into registration with the lower part of the cylinder.

It will be at once appreciated by those who are familiar with the construction and operation of internal combustion engines of the class to which my invention relates, that as many cylinders as desired may be combined in any preferred arrangement in a single structure, and that the special arrangement and construction of the parts which I have above described and illustrated herein may be quite decidedly departed from and still the essentials of the invention retained. I therefore wish it understood that the construction illustrated and described herein is one form or construction only in which my invention may be embodied; and it will also be noted that by my invention I realize a series of important advantages, some of which are, I believe, as heretofore stated, entirely new and others heretofore known are attained in a better manner than heretofore, among them are the following:

My engine has absolutely no valves of any kind whatsoever. It is silent in operation and requires no timing except for firing. The repair account will obviously be the minimum. There is a minimum of moving parts and all of them are large and have extended area of frictional contact, so that their use without repair will be great. I secure unusual power per size and stroke of cylinder because of increased frequency of driving impulses, one occurring at each half revolution of a crank shaft and this is unattended with any material increase in the weight of the mechanism to be driven. Again the construction is such that the intake devices for the piston, in other words, the extensions 17 and 18 therefrom are respectively compression and vacuum devices, the former effecting a preliminary compression of the charge which compels ejection of the spent products of combustion from the explosion chambers of the cylinder and assures a complete and efficient intake of fresh charges for succeeding explosions, and also because of the partial vacuums intermittently created, assuring a proper supply of fresh fuel. The exhaust being at one end of each explosion chamber within the cylinder and the fuel supply at the other end not only assures the expulsion of the products of combustion but also so far as it is possible so to do, insures against loss of fuel and this gives a more flexible engine than would otherwise be the case, increases efficiency at low speeds and effects better scavenging of the spent products. In addition to the foregoing the construction is simple and durable in its mechanical features, all of the parts being easily and inexpensively cast or forged and machined.

Referring now to Figs. 5 and 6, I illustrate in them a construction which embodies the essential features of the invention as shown in the other figures of the drawings, but has the additional advantage that the engine is reduced somewhat in height, that is to say, instead of having a piston rod 7 as shown in Figs. 1 and 2, extending through the lower end of the lower cylinder extension with stuffing box and crank case 6 below, I bring the crank case up close against the under side of the cylinder proper and permit the lower extension therefrom to project downwardly into it and rig connecting rods and piston rod on the outside of the cylinder supporting these parts in suitable slideways. In these Figs. 5 and 6 I mark the several parts with the same reference numerals as heretofore and refer specially only to the devices which in this construction differ from those shown in the other figures, that is to say, in the construction shown in Figs. 5 and 6, 33 is the crank case, 34 the main shaft, 35 the cranks, 36 and 37 the crank bearings, 38 the connecting rods which are pivotally connected with the slide blocks 39, one on each side of the cylinder and which are guided by and reciprocate in slideways 40 fastened to the sides of the cylinder. 41 is a yoke which projecting upwardly engages with the upper end of a piston rod 42 provided with stuffing box 43. The piston rod projects through the end of the upper extension 3 from the cylinder. This construction enables me to bring the crank case and main shaft close up against the under side of the cylinder, thus materially reducing the height of the engine.

As heretofore stated, it will be obvious to those who are familiar with such matters that the essentials of my invention may be embodied in constructions differing in many respects from those I have illustrated and described and I wish it understood that I do not in any wise limit myself thereto.

I claim:

1. In an engine, a cylinder having an extension chamber at each end, a piston having an extension at each side adapted to reciprocate through the cylinder extensions, the interior of the piston and its extensions being divided into two fuel ducts, a fuel supply pipe opening into one of the cylinder extensions, ports in the piston opening respectively into its said fuel ducts and which during the reciprocations of the piston alternately connect the cylinder extensions with the explosion chambers respectively at opposite sides of the piston, means to fire the charges and means to exhaust the products of combustion.

2. In an engine, a cylinder having an extension chamber at each end, a piston having an extension at each side adapted to reciprocate through the cylinder extensions, the interior of the piston and its extensions being divided into two fuel ducts, explosion chambers located between the inner walls of the cylinder and the outer walls of the piston extensions, a fuel supply pipe opening into one of the cylinder extensions, ports in the piston opening respectively into its said fuel ducts and which during the reciprocations of the piston connect the cylinder extensions with the explosion chambers respectively at opposite sides of the piston, means to fire the charges and means to exhaust the products of combustion.

3. In an engine, a cylinder having an extension chamber at each end, a piston having an extension at each side and a diaphragm dividing its interior into two separate gas ducts, ports in the piston extensions alternately connecting the respective cylinder extension chambers with the explosion chambers of the cylinder on opposite sides of the piston, means to supply fuel to one of the cylinder extension chambers, the ducts in the piston being so arranged as to effect the compression of the gas in the cylinder extension chambers upon the reciprocations of the piston, whereby at predetermined times the gas under pressure shall be discharged from the cylinder extension chambers into the respective explosion chambers at opposite sides of the piston, means to fire the charges and means to exhaust the products of combustion.

4. In an engine, a cylinder having an extension chamber at each end, a piston having an extension at each side and a diaphragm dividing its interior into two separate gas ducts, ports in the piston extensions alternately connecting the respective cylinder extension chambers with the explosion chambers of the cylinder on opposite sides of the piston, means to supply fuel to one of the cylinder extension chambers, the gas ducts in the piston being so arranged as upon the reciprocations of the piston to alternately effect the compression of the gas and create a partial vacuum in the cylinder extension chambers, ports in the piston opening into the respective gas ducts therein whereby at predetermined times the gas under pressure shall be discharged into the cylinder at opposite sides of the piston, means to fire the charges within the explosion chambers and means to exhaust the products of combustion.

5. In an engine, a cylinder having an extension chamber at each end, a piston having an extension at each side adapted to reciprocate through the cylinder extensions and to act as pump plungers therein, passages through the piston adapted to convey the fuel to one of the extension chambers of the cylinder and from both of them to the explosion chambers of the cylinder at opposite sides of the piston at predetermined times, means to fire the charges within the cylinder and means to exhaust the products of combustion.

6. In an engine, a cylinder having an extension chamber at each end, a piston having an open ended hollow extension at each side adapted to reciprocate through the cylinder extensions, means to supply fuel to one of the cylinder extensions, two separate gas ducts in the interior of the piston, ports in the piston connecting with the respective gas ducts therein, whereby during the reciprocations of the piston the respective cylinder extensions are connected through the piston with the explosion chambers on opposite sides of the piston, means to fire the charges and means to exhaust the products of combustion.

7. In an engine, a cylinder having an extension at each end, an exhaust port about midway its length, a piston having an extension at each side adapted to reciprocate through the cylinder extensions and to alternately compress the fresh charges and generate partial vacuums in the cylinder extensions, means to supply fuel to one of the cylinder extensions, passages in the piston adapted to convey the fuel to the other cylinder extension chamber and from them to the explosion chambers of the cylinder alternately at opposite ends of the cylinder when the piston in its reciprocations has uncovered the exhaust ports, and means at both ends of the cylinder to fire the charges upon each half revolution of the crank shaft.

8. In an engine, a cylinder having an extension at each end, an exhaust port about midway its length, a piston having an extension at each side adapted to reciprocate plunger-like through the cylinder extensions alternately compressing the gas and generating partial vacuums therein, means dividing the interior of the piston into two chambers, ports in the piston opening into said piston chambers, whereby the fuel under compression will pass from the cylinder extension chambers to the explosion chambers of the cylinders alternately at opposite sides of the piston when the piston in its reciprocations has uncovered the exhaust port, and means at both ends of the cylinder for firing the charges upon each half revolution of the crank shaft.

9. In an engine, a cylinder provided with an extension chamber at each end and an exhaust port about midway its length, the walls of the cylinder being otherwise imperforate, a reciprocating piston having an extension at each side adapted to reciprocate through the cylinder extensions and to act as gas pumps therein, gas ducts through the piston which during its reciprocations convey compressed gas from the respective cylinder extensions into the explosion chambers of the cylinder at opposite sides of the piston and means located near the ends of of the cylinder for firing the charges.

10. In an engine, a cylinder having an explosion chamber at each end, an extension chamber opening into each explosion chamber and an exhaust port about midway its length, a piston having an extension on each side adapted respectively to work through the cylinder extension chambers and act as pumps therein, gas ducts through the piston adapted to convey gas under pressure alternately to the explosion chambers on opposite sides of the piston, a fuel supply pipe opening into one of the extension chambers, means to fire the charges and means to exhaust the products of combustion.

In testimony whereof I have signed my name to this specification in the presence of two subscribing witnesses.

THEODORE PRATT.

Witnesses:
 PHILLIPS ABBOTT,
 EDWIN F. VALENTINE.